April 29, 1969  A. J. PEARSON  3,441,465
FILM FACED FIBROUS BODY

Filed Sept. 28, 1966

INVENTOR
ARTHUR J. PEARSON
ATTORNEYS

United States Patent Office 3,441,465
Patented Apr. 29, 1969

3,441,465
FILM FACED FIBROUS BODY
Arthur J. Pearson, Granville, Ohio, assignor to Owens-Corning Fiberglas Corporation, a corporation of Delaware
Continuation-in-part of application Ser. No. 292,350, July 2, 1963. This application Sept. 28, 1966, Ser. No. 582,613
Int. Cl. B32b *17/12, 3/02*
U.S. Cl. 161—84                                4 Claims

ABSTRACT OF THE DISCLOSURE

A rigid laminated panel of mineral fibers having a layer of scrim textile material disposed on a major surface thereof; a preformed film of flexible facing material contiguous to and coextensive with the scrim textile material and having portions extending outwardly beyond the panel to form flap-like extensions; and adhesive means securing the scrim textile material to the panel and to the film of facing material.

---

This specification is a continuation-in-part of my former application relating to a film faced fibrous body, filed July 2, 1963, and given a serial number of 292,350, now abandoned.

This invention relates to film faced fibrous bodies. Specifically, it relates to wallboards and panels which incorporate novel features providing advantages heretofore unachievable by other panels and wallboards.

Wallboards and paneling have previously been made of wooden boards, veneered plywood, or masonite or gypsum hardboards fitted in place, and nailed to furring or studding. The inventor has obviated the need for such structural backing and the attendant carpentry needed to install such wall panels. Furthermore, he has provided a panel incorporating ease of installation, an aesthetically appealing appearance, sound insulation, thermal insulation, a vapor barrier, and the preclusion of moisture and condensation from walls which are exposed to subterranean conditions. The architect, the home builder, and the remodeler are now able to install a panel which will solve many of the problems heretofore associated with the paneling or basements and other spaces.

It is therefore an object of the present invention to provide a fibrous product comprising a body formed of mineral fibers having a surface or area faced with a resinous film and a scrim-type reinforcement disposed between the film and the body surface, the components being adhesively joined or bonded to provide a product having high strength characteristics and effective acoustical and thermal insulating properties rendering the product suitable for many and various uses.

Another object of the invention is the provision of a product comprising a porous body of mineral fibers reinforced by a layer of scrim fabric adhered to a major face or surface of the product and a resin film superposed on the scrim fabric and adhered thereto; the film facing providing an attractive appearance enhancing the use of the product as a surfacing material where comparatively lightweight and substantial strength characteristics are desired.

A further object of this invention is to provide a wall panel which when used in a basement will generally prevent condensation from forming on the exposed surface of the panel.

Another object of this invention is to provide a wall panel which will limit the continued reverberation of a sound introduced into the room wherein this invention is employed.

Another object of this invention is to provide a panel which will minimize the need for thermal insulation within the wall in which this panel is used.

Another object of this invention is to provide a wood grained panel which may be installed without the necessity of studs or furring strips.

Another object of this invention is to limit moisture and the attendant odors therewith from permeating the atmosphere in basement spaces.

A further and better understanding of this invention may be had by reference to the following drawings in which FIGURE 1 shows an isometric view of a reinforced film faced fibrous body of the invention.

Figure 1:
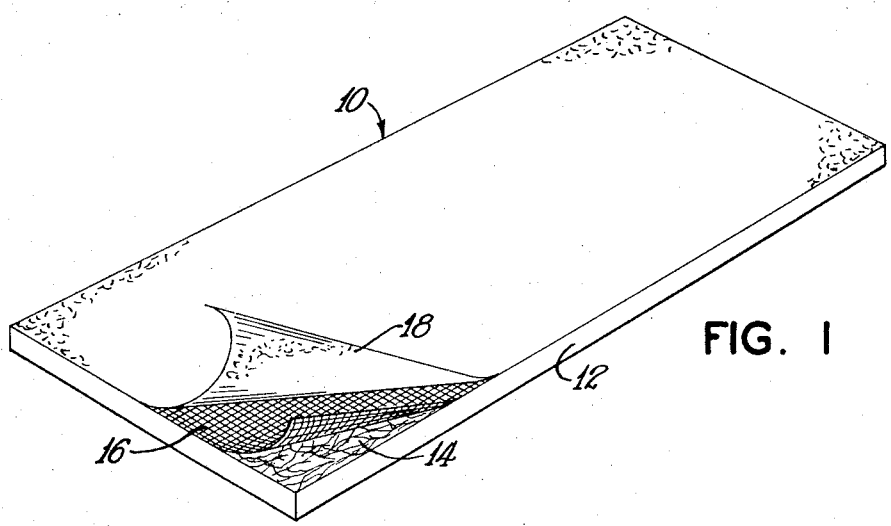
Figure 2:
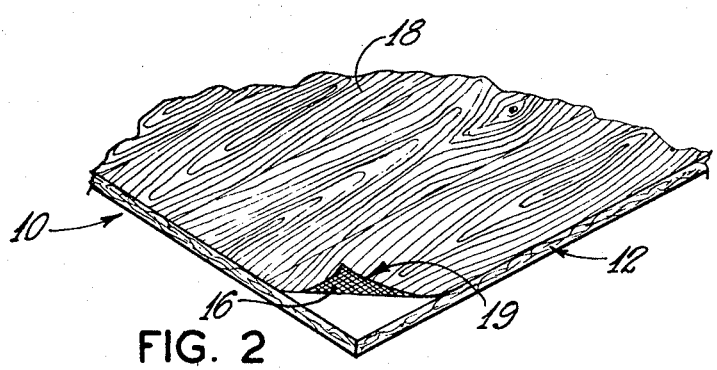
FIGURE 2 shows a fibrous board with a wood grained scrim backed film adhered thereto and partially rolled back from the corner of the substrate to expose the glass scrim cloth reinforcement affixed to the surfacing material.

FIGURES 1 and 2 represent the panel 10 which forms the instant invention. The panel 10 is composed of an underlayment of a fibrous mat or boardlike body 12. These mats or boards are used in the building trade, and comprise materials made of cellulose, wood, mineral fiber, glass fiber, and other fibrous materials. The board 12 described herein specifically embodies the use of fibrous glass, however, any suitable underlayment made of any of the foregoing basic fibers would be adaptable if the underlayment were of a suitable density to make this invention thermally and acoustically operative.

FIGURE 1 illustrates one form of product 10 of the invention reinforced to provide high strength characteristics of a character usable for thermal insulation, or as a surfacing material or acoustic tile having particular application for ceilings or walls wherein the film facing enhances the decor or visual appearance of the product without appreciably affecting its sound attenuating properties.

As illustrated in FIGURE 1, the board or body 12 is fashioned of mineral fibers, such as glass fibers, in mat formation and the fibers compressed to a desired density depending upon the end use for the product. Where substantial rigidity is not required, the body 12 may be of a density of about three poounds per cubic foot or less. Where substantial rigidity is desired, the fibers of the board or body 12 may be compressed to a density greater than three pounds per cubic foot. However, the density should not exceed that which is necessary to attenuate sound yet should be of a density capable of withstanding any abusive treatment to which the board is subjected. For example, in a basement utilization thereof, the inventor has found a board 12 of eleven and one half pounds density readily adapted, so that sound may be attenuated therein and yet the board will be sufficiently strong during normal use.

The body or board 12 may be of a thickness of from ⅜ of an inch up to 2 inches or more depending upon the end use for the product and is prefabricated by conventional methods. For example, attenuated glass fibers, bearing a suitable binder or adhesive such as phenolformaldehyde, are collected in a mass, the mass compressed to the desired thickness and density, and the mat in compressed condition conveyed through a heated environment or oven to set or cure the binder or adhesive to provide mass integrity in the mat.

A feature of the invention involves the provision of a scrim reinforcement for the fibrous body 12 and a film facing on the product. As shown in FIGURE 1, there is disposed contiguously with a major face 14 of the body 12, a reinforcing layer of scrim material or textile 16 which is adhesively joined to the face 14 of the body 12. Superposed on the scrim reinforcement 16 is a resinous film 18 which is adhesively bonded or joined with the reinforcement 16 providing a laminated, scrim reinforced film faced fibrous product. The adhesive preferably includes a solvent type synthetic rubber base such as a neoprene rubber containing other constituents or fillers functioning as flame retarders providing low flame propagation characteristics.

The scrim component 16 is preferably formed of strands or yarns of glass filaments or fibers fabricated as an open mesh textile wherein the strands or yarns are woven or unwoven in formation of the scrim component. The facing film 18 is in the form of a prefabricated, self-supporting film, such as a vinyl film preferably fashioned with embossing to present an attractive appearance by masking the mesh pattern of the scrim material.

The end product illustrated in FIGURE 1 may be used as thermal insulation, acoustic tile or as a surfacing board for walls and ceilings. The product provides effective sound attenuation and the sound attenuating properties may be enhanced by pinhole perforations in the facing film 18. It is to be understood that while vinyl film, being a copolymer of vinyl chloride and vinyl acetate, provides a satisfactory film facing for the product, other resin films may be utilized for the purpose.

It has been found that the most efficacious utilization of the fibrous glass scrim 16 may be obtained when the scrim is first adhered to the film 18 prior to being adhered to the fibrous body 12. Thus, the scrim 12 lends its dimensional stability directly to the film 18, limiting any undesirable plastic deformation thereof. Fibrous glass scrim 16 is dimensionally stable, and provides a higher modulus of elasticity than most backings when used as a reinforcement backing for the invention described. Dimensionally stable as used herein ascribes to the scrim 16 the fact that there will be a resistance to stretching and deformation thereof, and a modulus of elasticity imparted to the scrim-film laminate 19 higher than that of the film 18 alone. The scrim 16 is adhered to the surfacing film 18 preferably by a neoprene solvent based adhesive. The scrim 16, when adhered to the film 18 and then applied as an integrated laminate 19 renders a greater degree of dimensional stability to the surface 18 because of its direct adhesion thereto. It also effectively functions as a structural reinforcement to the surfacing film 18 for purposes of spreading impacts thereon.

Although an adhesive may be used to adhere the scrim to the film, a heat pressing may be used. In this method the film is heated sufficiently to allow the higher softening temperature glass to be pressed thereunto. After the film hardens, the glass scrim is left embedded therein as an integral part.

It has been found that the best process for adhering the scrim-film laminate 19 to the board 12 is to first spray the board 12 with the adhesive after which the film and scrim laminate 19 is roll coated with adhesive. The two are then joined at their respective adhesive surfaced sides. Through this method of application a tightly bonded film facing can be obtained with respect to the body or substrate 12. It has been found that if adhesive is applied to only the film or only the board, a bond between the two will not be maintained over a long duration.

Film facings were first applied without the use of adhesive application on both the scrim-film laminate 19 and the substrate or body. It was found that such a method of application generally rendered the panel unusable because of the tendency of the laminate 19 to delaminate from the fibrous body 12. The adhesive which is sprayed onto the body 12 is absorbed therein and forms a linkage so that the adhesive which is roll coated onto the back of the laminate 19 interbonds itself with the fibrous body 12.

Figure 3:
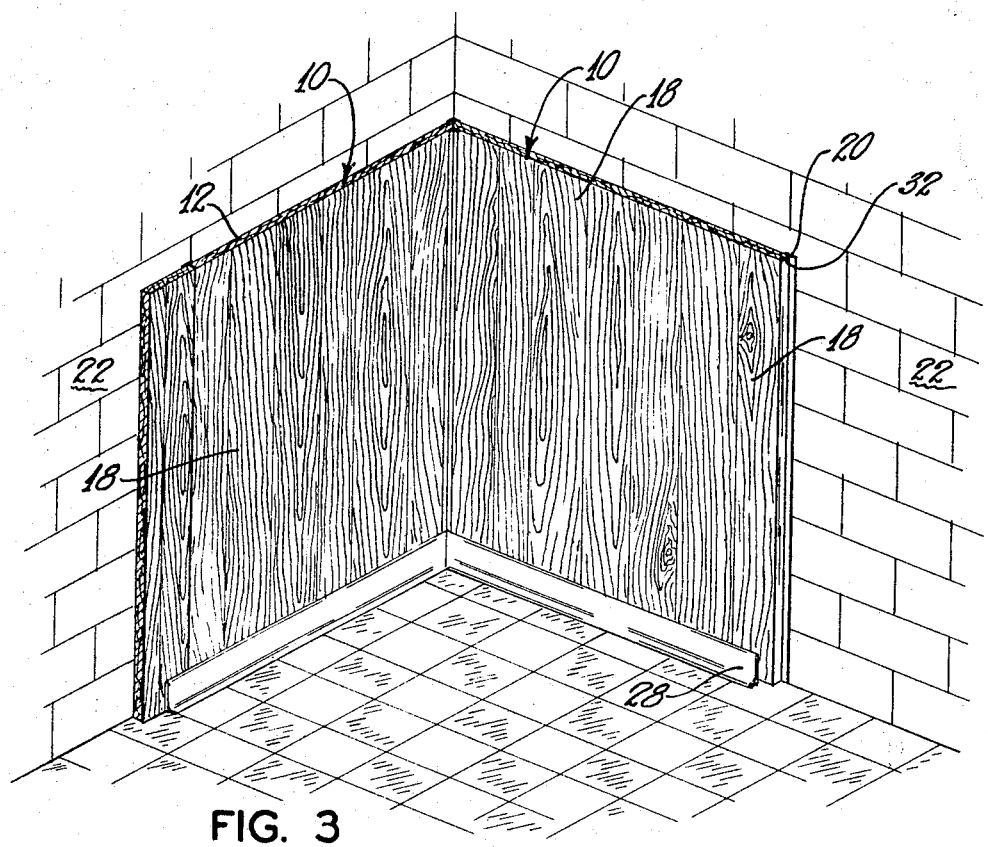
FIGURE 3 shows a masonry walled room with the instant invention adhered to the surface of the masonry wall. The invention is sectioned horizontally to show the cross sectional representation thereof, as well as the outward appearances when installed.
Figure 4:
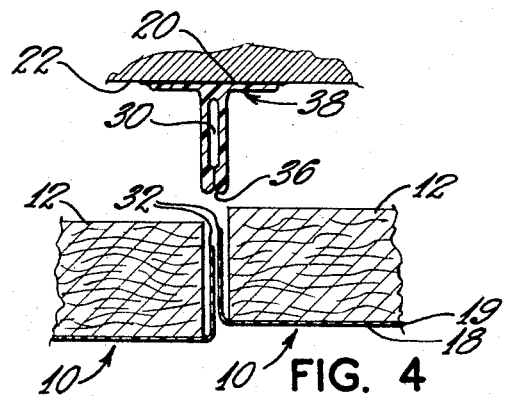
FIGURE 4 shows a cross section of one of the methods of attaching the board to a masonry wall by means of a clip affixed to the masonry wall. The clip has a beaded channel therein which nips the surfacing material of the board, thereby forming a relatively smooth joinder between the boards.

FIGURE 3 shows the panel 10 in place against a masonry wall 22. The board as shown therein is affixed to the masonry wall by means of a mastic adhesive 20. Although the mastic adhesive may be used alone to maintain the panel against the surface of the masonry wall, it is preferred in most instances that a longitudinally beaded channel 30 or nip system be used as follows.

The channel 30 is formed in a vertical T 38 or clip with the channel 30 in the upright portion thereof and a bead 36 therein for the purpose of maintaining the film bordering material in tight fitting relationship within the channel. Two film borders 32 thus adjoin each other contiguously and are inserted and nipped by the bead 36 of the channel 30 of the upright portion of the longitudinal T 38. The borders 32 are locked in juxtaposed position so that they form a relatively smooth planar surface or joint between the surfaces of the two panels 10. The clip 38 or nip may be adhered to the surface of the masonry 22 wall by a mastic adhesive or a masonry nail driven therethrough. The clip 38 may be made of any suitable material having a resilient nature so that the channel 30 will provide a constriction against the movement of the facing material 32 placed therein.

The top and bottom bordering material may be maintained in the foregoing manner or by a molding 28 placed thereat. If the panel is to be affixed to the wall without the use of the molding 28 at the top and bottom of the panel, the border of the film surfacing material should be folded under the back edge of the panel and maintained thereby. In installations using only a mastic, the mastic sometimes loosens or the soft adhesive characteristics thereof are not maintained over a long period of time due to climatic or other conditions, thereby allowing the panel to detach itself from the surface of the masonry wall. For this reason the preferable installation on a masonry wall is with the T clip 38 held on the wall by a masonry nail. By this method, even if the mastic comes loose, the board is maintained against the surface of the masonry wall.

With the foregoing clip system, even though leaks in the masonry wall may cause water to flow between the panel and the wall, the panel will be maintained against the surface of the wall.

It can be readily seen from the foregoing that the panel 10 is easily installed by merely affixing the retaining clips 38 to the structural wall for the insertion of the border film 32 therein. This ease of installation allows the industry to make great savings in labor, and at the same time install a quality panel. The ease of installation and the superiority thereof can be exemplified by the following example, wherein it took one man only four hours to install the invention disclosed herein in a room having roughly 600 sq. ft. of floor space.

The instant invention has great application when used as an interior covering for a subteranean masonry wall. This is particularly true when the invention is applied to a basement wall which is cross sectionally subject to changes in thermal conditions because of the temperature differential between the outside of the wall which is exposed to the ground and the inside of the wall having a higher temperature exposure than that of the ground. The foregoing temperature differential can cause condensation on the wall which is often bothersome and unmanageable when it comes to maintaining the wall surface from being marked, stained, or discolored with condensation drippings. Such condensation on the side of basement walls has not only created an aesthetic detraction, but has also created excess moisture that causes discomfort during the summer months. This discomfort is compounded when the moisture which is in the basement area entrains odors and other unpleasantries associated with subterranean areas, thereby creating a displeasing atmosphere for the occupant.

The foregoing deleterious aspects are eliminated by raising the temperature of the surface which is exposed to the interior of the basement to a temperature which would not be cold enough to condense the moisture within the basement space. This is done by the absorption of thermal energy from the subterranean space thereby raising the temperature within the fibrous board and the attendant surfacing material, and precluding a sharp temperature drop between the inner face of the surface of the wall and the air coming in contact therewith. Thus, the temperature of the face of the panel is close to the temperature of the atmosphere in the subterranean area, and in most instance under average use is not low enough in temperature to precipitate condensation on the surface thereof.

By the elimination of condensation on basement walls the inventor has drastically improved the living conditions of basement or subterranean spaces as well as the aesthetic appearances thereof. The dank and rancid smell which is associated with basements or subterranean areas is eliminated and a warm dry living space is provided for many houses previously without the use of such space.

Rooms with masonry walls have often created sound control problems for the occupants thereof. Sound emanating from a particular source in such rooms tends to be generated in waves having both horizontally and vertically oriented vectorial components. Thus, for effective sound attenuation and the maximum limitation of reverberations emanating from secondary sources within masonry walled room, it is necessary to damp these reverberations at a point on the wall surfaces which this panel provides, as well as by acoustical ceiling means.

Although the panel of this invention has been partially described in relation to its use with a basement or a masonry wall, it must be appreciated that this board may be used to obtain many of the desirable characteristics on a wall within a room which has either an old wall to be remodeled, or a new structural wall with nothing on the surface thereof. Thus, this board may be used to surface aesthetically displeasing plaster walls providing a pleasing wood grain finish with thermal and sound dampening characteristics not associated normally with such plaster walls, or provide a low noise level where a great deal of machinery or human noises must be attenuated for adequate occupant comfort.

Although this board can be used substantially for remodeling purposes in a room where the surfaces of the walls are badly cracked or in need of a more decorative appearance, it should be recognized that this panel finds a great deal of use in the attenuation of sound and therefore is of major interest in new installations wherein a low coefficient of reverberation is to be maintained. This board has been used in office spaces and other areas of high noise concentration. The sound dampening effect was found to be considerably higher than that obtained by any previous acoustical ceiling application alone.

Thus, the invention can be and is broadly applied to solve many problems with respect to the use of basement spaces, and the control of sound and temperature for all human occupancy spaces.

Having thusly described my invention and wishing to take full scope and advantage of the spirit and application thereof, I hereby claim:

1. A rigid laminated panel comprising:
   a flat body of interbonded compressed mineral fiber of a thickness in a range of from three-eighths of an inch to two inches and of a density not less than three pounds per cubic foot;
   a layer of scrim textile disposed on and engaging a major surface of the flat body;
   a preformed film of flexible facing material contiguous to said layer of scrim textile, said film having portions thereof which extend outwardly beyond at least two opposing edges of said flat body and said scrim textile to form respective flap-like extensions, said flap-like extensions constituting flexible means for joining said panel to a supporting surface; and
   an adhesive securing said layer of scrim textile to said body and to said film of facing material.

2. The invention defined in claim 1 wherein said flat body is formed of glass fibers.

3. The invention defined in claim 1 wherein said scrim textile is formed of mineral fibers.

4. The invention defined in claim 1 wherein said scrim textile is formed of glass fibers.

References Cited

UNITED STATES PATENTS

| | | | |
|---|---|---|---|
| 2,490,663 | 12/1949 | Vanuum et al. | 52—509 X |
| 2,605,514 | 8/1952 | Eshenaur et al. | 161—119 X |
| 3,052,019 | 9/1962 | Strasser | 29—424 |
| 3,092,203 | 6/1963 | Slayter et al. | 161—165 X |
| 3,222,237 | 12/1965 | McKelvy | 156—177 |

ROBERT F. BURNETT, *Primary Examiner.*

R. L. MAY, *Assistant Examiner.*

U.S. Cl. X.R.

52—385, 509, 599; 161—86, 89, 93, 145; 181—33.1